US008705722B2

(12) United States Patent
Boni et al.

(10) Patent No.: US 8,705,722 B2
(45) Date of Patent: Apr. 22, 2014

(54) AUTOMATIC ROUTING OF COMMUNICATIONS TO USER ENDPOINTS

(75) Inventors: Piotr Boni, Providence, RI (US); Douglas R. Jones, Medford, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1851 days.

(21) Appl. No.: 11/751,912

(22) Filed: May 22, 2007

(65) Prior Publication Data

US 2008/0292074 A1 Nov. 27, 2008

(51) Int. Cl.
*H04M 3/42* (2006.01)

(52) U.S. Cl.
USPC ................................. 379/211.02; 379/212.01

(58) Field of Classification Search
USPC ........... 379/211.02, 212.01, 211.01; 370/352; 455/456.1
See application file for complete search history.

(56) References Cited

U.S. PATENT DOCUMENTS

| | | | |
|---|---|---|---|
| 5,353,331 A | 10/1994 | Emery et al. | |
| 5,469,496 A | 11/1995 | Emery et al. | |
| 5,930,700 A * | 7/1999 | Pepper et al. | 455/435.3 |
| 7,116,975 B1 | 10/2006 | Link et al. | |
| 7,269,162 B1 * | 9/2007 | Turner | 370/352 |
| 7,668,157 B2 * | 2/2010 | Weintraub et al. | 370/352 |
| 7,917,583 B2 | 3/2011 | Angiolillo et al. | |
| 2003/0185232 A1 * | 10/2003 | Moore et al. | 370/465 |
| 2003/0185372 A1 * | 10/2003 | Henz | 379/207.02 |
| 2004/0005045 A1 * | 1/2004 | Adams et al. | 379/201.02 |
| 2005/0026628 A1 * | 2/2005 | Fujiwara | 455/456.1 |
| 2005/0122963 A1 * | 6/2005 | Jeon et al. | 370/352 |
| 2006/0085419 A1 * | 4/2006 | Rosen | 707/9 |
| 2008/0003964 A1 * | 1/2008 | Alperin et al. | 455/185.1 |
| 2010/0115019 A1 * | 5/2010 | Weintraub et al. | 709/202 |
| 2010/0191820 A1 * | 7/2010 | Daniell et al. | 709/206 |

OTHER PUBLICATIONS

Rosenberg, "A Presence Event Package for the Session Initiation Protocol (SIP)—RFC 3856," Network Working Group, The Internet Society, 25 pages, Aug. 2004.
Rosenberg, "A Processing Model for Presence", IETF draft-rosenberg-simple-presence-processing-model-02 (work in progress), Jun. 2006.

* cited by examiner

*Primary Examiner* — William Deane, Jr.

(57) ABSTRACT

A system may receive configuration information relating to forwarding of communications in a network from a first endpoint to other endpoints. Presence information may also be received for the endpoints. The presence information may include proximity information indicating whether pairs of the endpoints are in physical proximity to one another. The system may forward communications destined for a first of the plurality of endpoints to a second of the plurality of endpoints based on the configuration information and the presence information.

21 Claims, 10 Drawing Sheets

| DEVICE | ON/OFF STATE 610 | PROXIMITY INFORMATION 620 |
|---|---|---|
| 312 | ON | PAIRED WITH TELEPHONE |
| 318 | OFF | NONE |
| 314 | ON | NONE |
| 316 | ON | PAIRED WITH MOBILE DEVICE |

AUTOMATIC ROUTING OF COMMUNICATIONS TO USER ENDPOINTS

BACKGROUND INFORMATION

Modern telecommunication networks can provide a number of different types of services to users. For example, users may communicate with one another through voice calls, text messages, or video calls.

Users frequently employ a number of different communication devices to communicate with one another. For example, members of a family may, at various times, communicate with one another or with others using a home phone, multiple mobile phones (e.g., one for each member of the family), personal computers, or a television set-top box. The preferred communication device to use at any given time may depend on a number of factors.

DETAILED DESCRIPTION OF PREFERRED EMBODIMENTS

The following detailed description of exemplary implementations refers to the accompanying drawings. The same reference numbers in different drawings may identify the same or similar elements. Also, the following detailed description does not limit the invention.

Implementations described herein may automatically route communications (e.g., a voice call, video call, text message, video message, etc.) to an appropriate communication endpoint device. The choice of which endpoint to use may be based on factors such as pre-registered user preference information, presence information of the endpoint, and proximity information that relates to the physical distance between endpoints.

Figure 1:
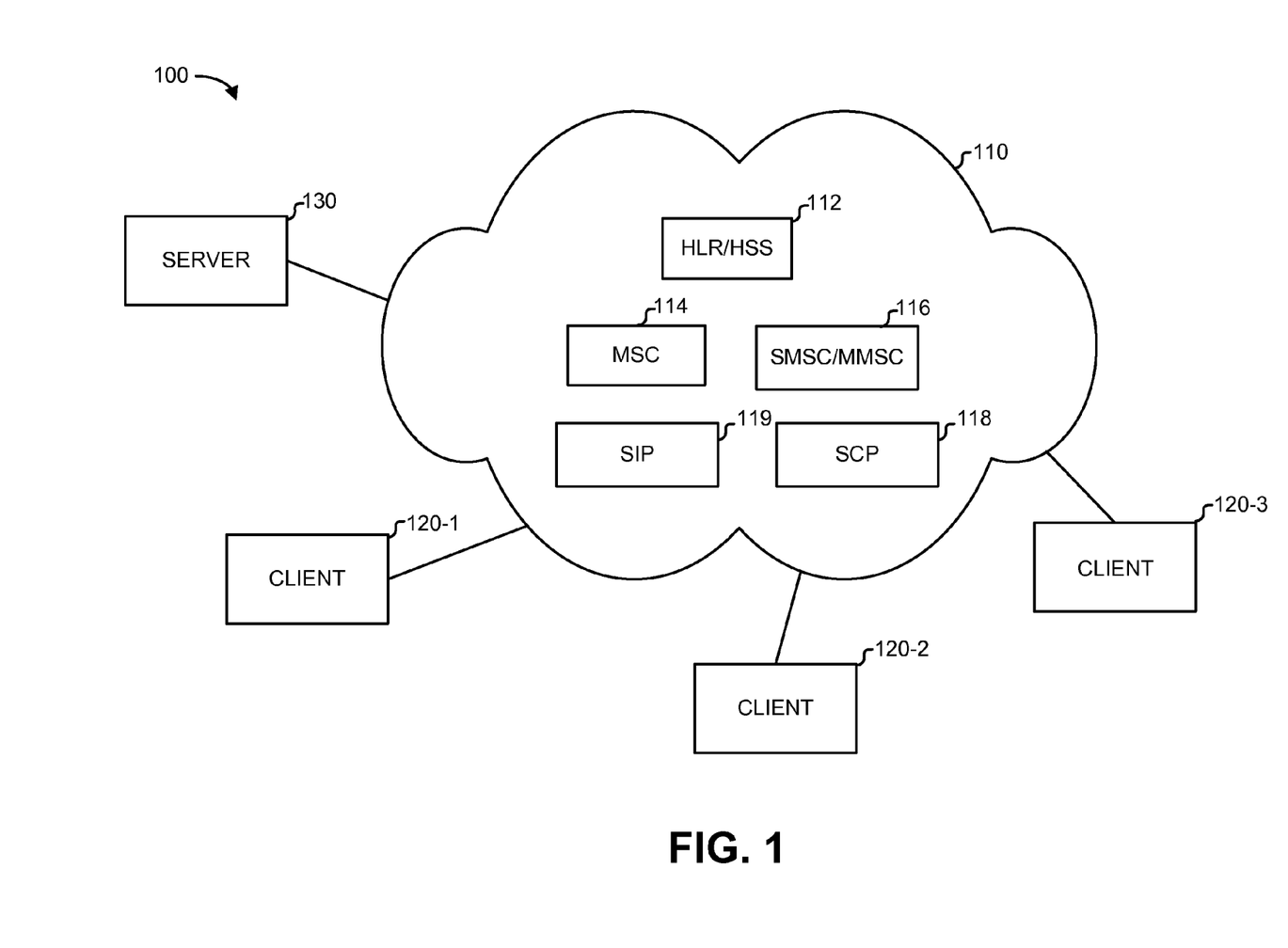
FIG. 1 is a diagram illustrating an exemplary system in which concepts described herein may be implemented.

FIG. 1 is a diagram illustrating an exemplary system 100 in which concepts described herein may be implemented. As shown, system 100 includes a network 110, three client devices 120-1 through 120-3 (collectively, client devices 120), and a server 130.

Network 110 may generally include one or more networks that provide telephony or data services to client devices 120 and server 130. Network 110 may include one or more networks of any type, including a Public Land Mobile Network (PLMN), a Public Switched Telephone Network (PSTN), a cellular network, a VoIP network, a metropolitan area network (MAN), a wide area network (WAN), a local area network (LAN), a private network, the Internet, an intranet, and/or another type of network. Network 110 may particularly represent a number of different types of networks, such as a cellular network, a PSTN, and a wide area data network (e.g., the Internet). In this situation, network 110 may also include gateway devices that provide interfaces between different network types.

Network 110 may include network devices that provide control points for telephony or data services through network 110. A number of exemplary devices that provide control points for telephony or data services are shown in FIG. 1. As shown, the network devices include a home location register (HLR) and/or home subscriber service (HSS) database 112, a mobile switch center (MSC) 114, a short message service center (SMSC) 116 and/or a multimedia messaging service center (MMSC) 116, a service control point (SCP) 118, and a session initiation protocol (SIP) server 119.

HLR/HSS 112 may include one or more network devices that implement a user database for a mobile telephone network. As an HLR database, HLR/HSS 112 may contain details of mobile telephone subscribers in a network such as a GSM (Global System for Mobile Communications) or CDMA network. HLR may store details relating to subscriber identity modules (SIMs) issued by one or more mobile telephone operators. Each SIM may include a unique identifier that can be used as a primary key to index HLR. As an HSS database, HLR/HSS 112 may contain user profile information that is accessed when delivering multimedia services to end users. For example, the HSS may support network entities that are handling multimedia calls/sessions in an Internet Protocol (IP) multimedia subsystem (IMS) framework.

MSC 114 may include one or more switches or exchanges that provide an interface between a mobile telephone network and another network. For example, MSC 114 may provide an interface between a GSM, TDMA, or CDMA cellular network and a PSTN network. MSC 114 may perform signaling functions that are necessary to establish calls to and from mobile phones.

SMSC 116 may include one or more devices for implementing text messaging in a mobile telephone network. If a user sends a text message (e.g., a short message service (SMS) message) to another user, the message may be received and forwarded by SMSC 116 to the destination user. SMSC 116 may generally be responsible for locating the destination user and submitting the message to the destination user. A user may also use a multimedia messaging service (MMS) to send and receive messages with text, graphics, voice and/or audio, such messaging may be handled by MMSC 116.

SCP 118 may include one or more devices in an intelligent network system that control the intelligent network services. In an intelligent network, such services generally include value-added services in addition to standard voice calls. Examples of such value-added services include number translation services (e.g., if translating toll free numbers to regular PSTN numbers) and prepaid telephone calls. SCP 118 may be deployed using any of a number of technologies, such as Signaling System 7 (SS7), Sigtran, or Session Initiation Protocol (SIP) technologies.

SIP server 119 may include one or more computing devices that provide SIP signaling services to client devices 120. SIP signaling may be used to setup and tear down communication sessions, such as in setting up and tearing down voice or video calls or chat/text conversations.

Client devices 120 may include one or more devices that provide an interface through which users can communicate with other clients. Client devices 120 may include mobile telephones, personal computers, laptops, personal digital assistants, telephone devices, television set-top boxes, and/or other types of communication devices. Client devices 120 may connect to network 110 via wired and/or wireless connections. Client devices 120 may be referred to as "endpoints" herein.

Server 130 may include one or more computing devices that provide services to client devices 120. Server 130 may include, for example, a web server that provides web pages to client devices 120, an application server, a presence server or additional types of servers.

The number of networks 110, clients 120, or servers illustrated in FIG. 1 is provided for simplicity. In practice, there may be more networks 110 or clients 120, or servers 130. Moreover, in some embodiments, client devices 120 may perform functions described as being performed by server 130 and server 130 may perform functions described as being performed by client devices 120.

Figure 2:
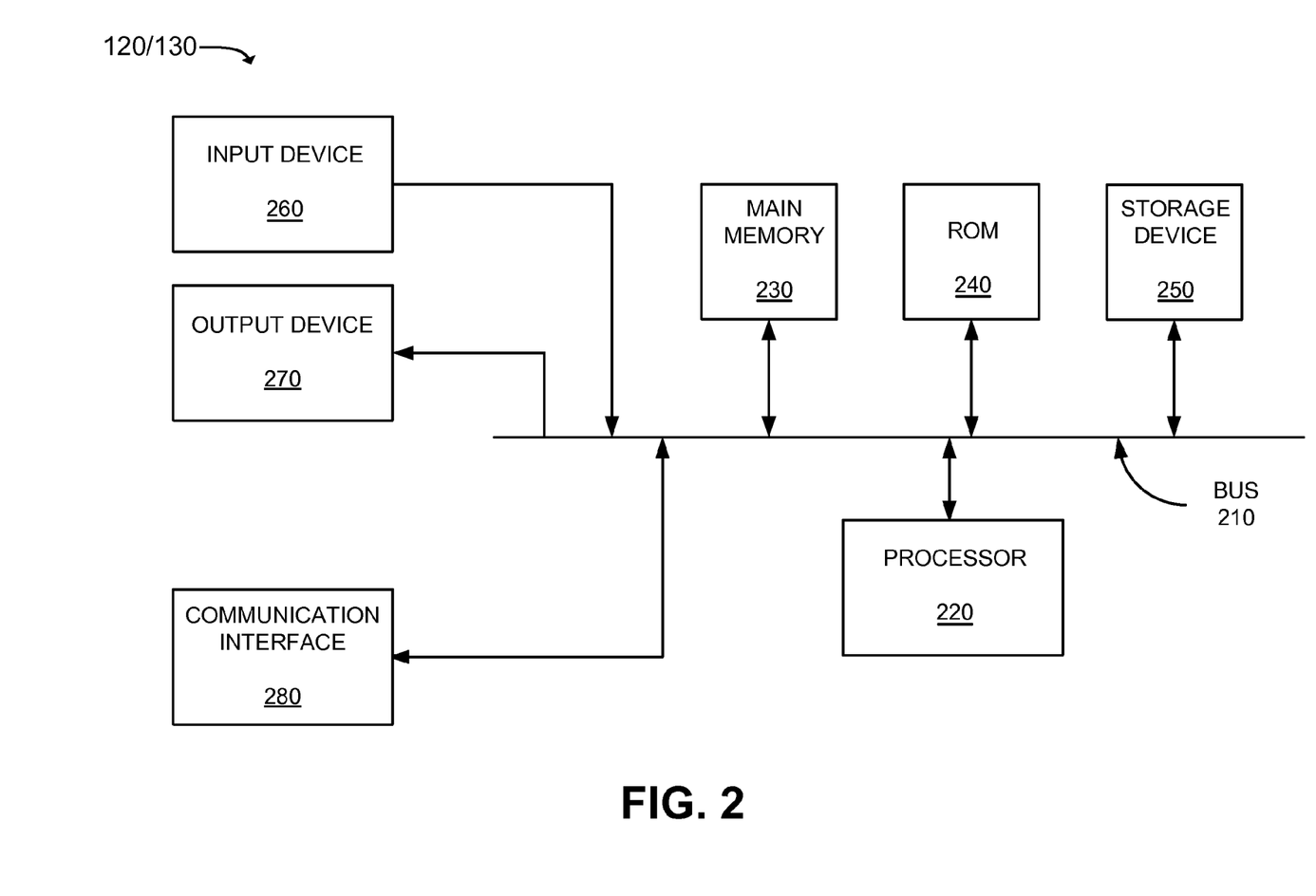
FIG. 2 is a diagram of an exemplary client device or server shown in the system of FIG. 1.

FIG. 2 is a diagram of an exemplary client device 120 or server 130. Client/server 120/130 may include a bus 210, a processor 220, a main memory 230, a read only memory (ROM) 240, a storage device 250, an input device 260, an output device 270, and a communication interface 280. Bus 210 may include conductors or a pathway that permit communication among the components of client/server 120/130.

Processor 220 may include a processor(s), a microprocessor(s), or processing logic that interprets and executes instructions. Main memory 230 may include a random access memory (RAM) or another type of dynamic storage device that stores information and instructions for execution by processor 220. ROM 240 may include a ROM device or another type of static storage device that stores static information and instructions for use by processor 220. Storage device 250 may include a magnetic and/or optical recording medium and its corresponding drive.

Input device 260 may include one or more mechanisms that permit a user to input information to client/server 120/130, such as a keyboard, a mouse, a pen, voice recognition and/or biometric mechanisms, etc. Output device 270 may include one or more mechanisms that output information to the user, including a display, a printer, a speaker, etc. Communication interface 280 may include any transceiver-like mechanism that enables client/server 120/130 to communicate with other devices and/or systems. For example, communication interface 280 may include mechanisms for communicating with another device or system via a network, such as network 110.

As will be described in detail below, server 130 may implement functions relating to automatic or "smart" routing of communications to client device 120. Software implementing these functions may be stored in a computer-readable medium, such as memory 230. A computer-readable medium may be defined as one or more physical or logical memory devices.

The software instructions defining the operations of server 130 may be read into memory 230 from another computer-readable medium, such as data storage device 250, or from another device via communication interface 280. The software instructions contained in memory 230 may cause processor 220 to perform processes that will be described later. Alternatively, hardwired circuitry or other logic may be used in place of, or in combination with, software instructions to implement processes described herein. Thus, embodiments described herein are not limited to any specific combination of hardware circuitry and software.

Figure 3:
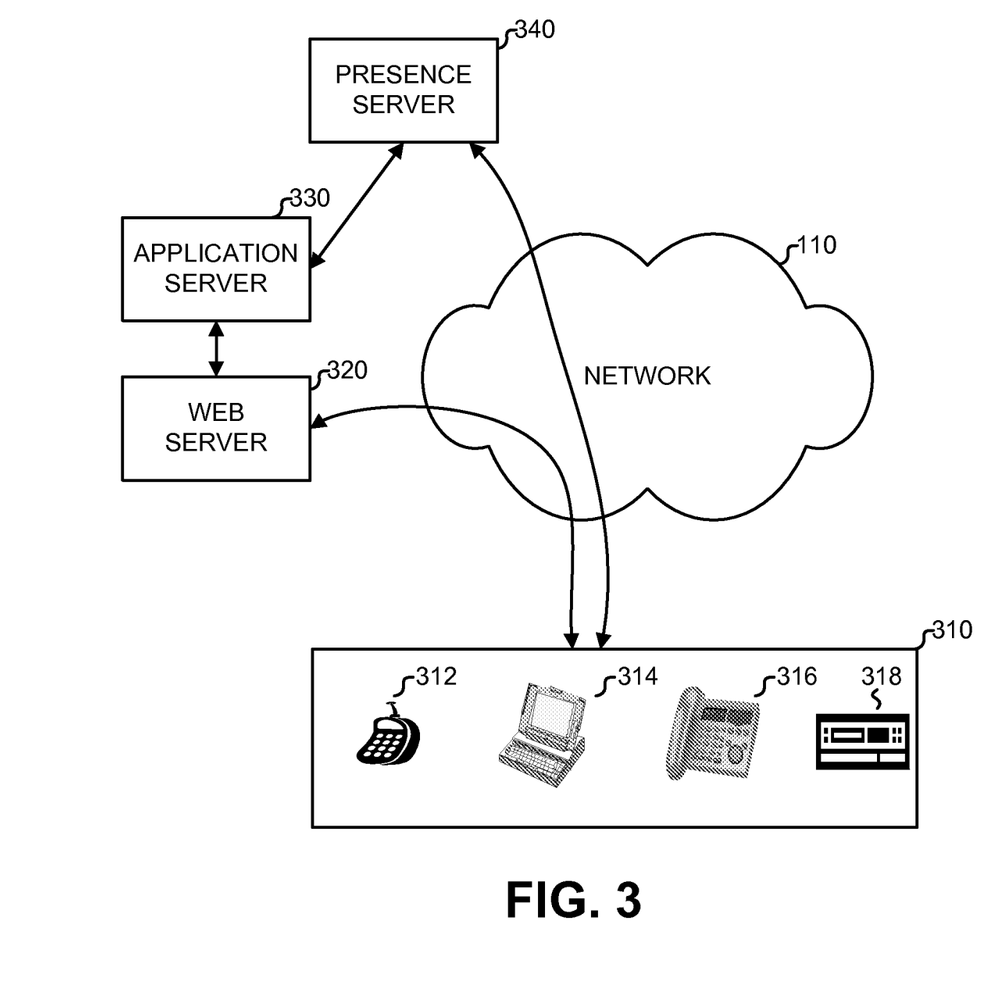
FIG. 3 is a diagram conceptually illustrating entities that may be used in automatic routing of communications.

FIG. 3 is a diagram conceptually illustrating an exemplary implementation of automated routing of communications in network 110. As shown in FIG. 3, a system 300 may include network 110, a number of endpoints 310, a web server 320, an application server 330, and a presence server 340.

Endpoints 310 may collectively represent a number of user communication devices, such as multiple communication devices of a particular user or family of users. As shown in this example, a user may have a mobile device 312 (e.g., a cell phone, smart phone, personal digital assistant with wireless communication abilities, etc.), a personal computer 314 that includes software for handling one or more of text messaging or voice/video calls, a VoIP telephone 316, and a set-top box 318. Different ones of devices 312-318 may be capable of sending and receiving different types of communications. For example, mobile device 312, personal computer 314, and VoIP telephone 316 may be capable of receiving voice calls; personal computer 314 may be capable of receiving voice and/or video calls; and each of devices 312-318 may be capable of receiving text messages.

Consistent with concepts described herein, communications (e.g., voice, video, or text) for a first of endpoints 310 may be automatically routed to the one or more other endpoints 310. The automatic routing may be based on a number of factors, including the type of device relative to the type of communication, user preferences, and presence information of the endpoints. Presence information may include the on/off state of endpoints and proximity information of different ones of endpoints 310 to one another.

One or more server devices may perform the automatic routing described herein. As shown in FIG. 3, these server devices may include web server 320, application server 330, and presence server 340. Web server 320 may provide a web interface through which a user of endpoints 310 can view and modify parameters relating to the automatic routing. Through the web interface the user may, for example, input information relating to which endpoints the user would like to register for automatic routing, the relative priority of the endpoints in receiving communications, and the preferred conditions by which the automatic routing is to be conducted.

Application server 330 may receive the user parameters from web server 320 and receive presence information relating to endpoints 310. Based on this information, application server 330 may make routing decisions for communications with endpoints 310. The routing decisions may be available or communicated to control points for telephony or data services in network 110.

Although application server 330 is shown separate from web server 320 in FIG. 3, the functions of web server 320 and application server 330 may, in some implementations, be performed by a single computing device or set of computing devices.

Presence server 340 may be used to provide presence information in, for example, a Presence Information Data Format (PIDF) to facilitate the call and data routing decisions. Presence may include the on/off state of client devices and/or proximity information of different ones of client devices to one another. Application server 330 or endpoints 310 may communicate with presence server 340 to coordinate automatic routing to the appropriate one of endpoints 310. Application server 330 and/or presence server 340 may additionally communicate with network control points, such as to HLR/HSS 112, MSC 114, SMSC/MMSC 116, and SCP 118 to implement the routing decisions.

The various network control points illustrated in FIG. 1 (i.e., HLR/HSS 112, MSC 114, SMSC 116, SCP 118, and SIP server 119) are exemplary. The particular signaling or communication protocols used to connect and transfer communications through network 110 are not critical and may depend on the types of networks or technologies that are being used. For example, SIP server 119 may be replaced or supplemented with a SS7 device if routing calls through a PSTN network.

Figure 4:
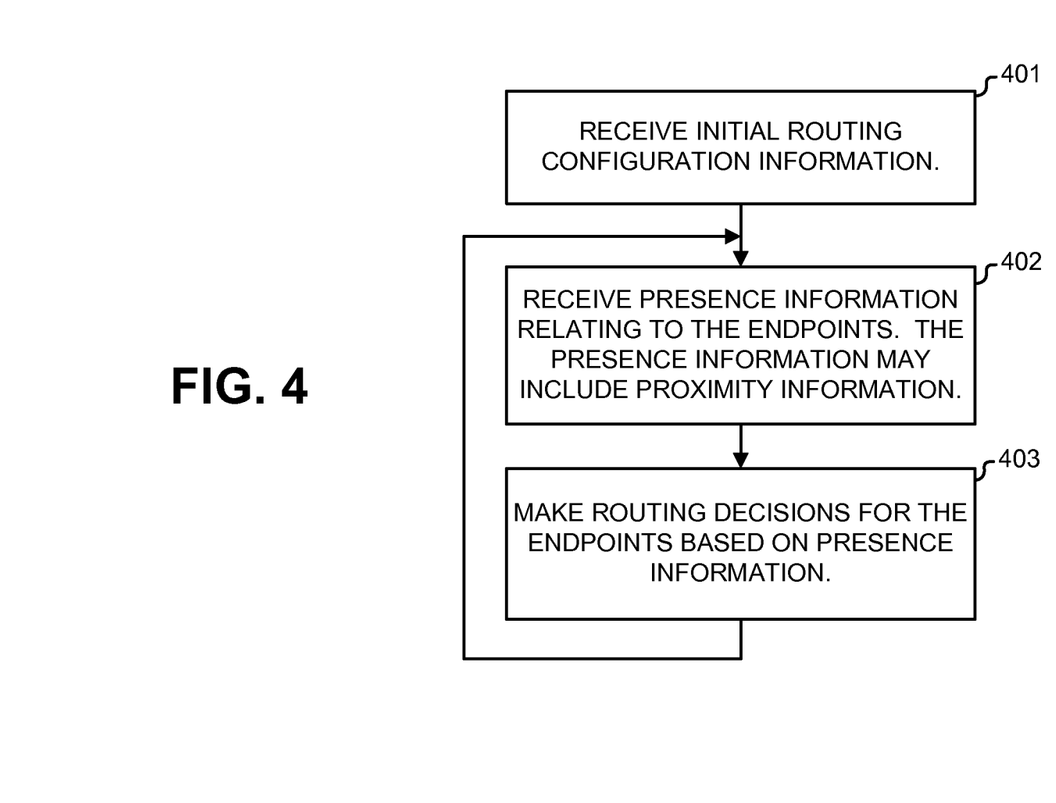
FIG. 4 is a flow chart illustrating exemplary operations that may be performed in implementing automatic routing.

FIG. 4 is a flow chart illustrating exemplary operations that may be performed in implementing automatic routing. As shown in FIG. 4, application server 330 may receive and store routing configuration information for each particular user or set of users (e.g., a family) (act 401). The configuration information may include, for example, a listing of the devices that the user would like to register for automatic routing, priority preferences for the automatic routing, and condition information for the automatic routing. In general, it may be desirable to make the configuration for a set of devices as easy and automatic for the user as possible. For example, the configuration information for a group of devices may be initially provided with default settings that most users are likely to use without any modification. Once the configuration information is set (or, alternatively, the default settings used), the automatic routing may be implemented without further user intervention.

In one implementation, users may enter configuration information through a web interface presented by web server 320. Web server 320 may initially present the user with a default prioritization and routing conditions for endpoints 310. The user may be permitted to customize this information. For example, assume that the user would like to have automatic routing enabled in which calls or text messages for mobile device 312 are automatically routed to one of personal computer 314, telephone 316, or set-top box 318. Web server 320 may present an interface allowing the user to customize the priority and conditions by which communications are routed to personal computer 314, telephone 316, and set-top box 318.

In some implementations, the user may update the configuration information whenever desired through, for example, a web site or through other interfaces, such as through an interactive voice response (IVR) system or a custom menu system installed in, for example, set-top box 318.

Figure 5:
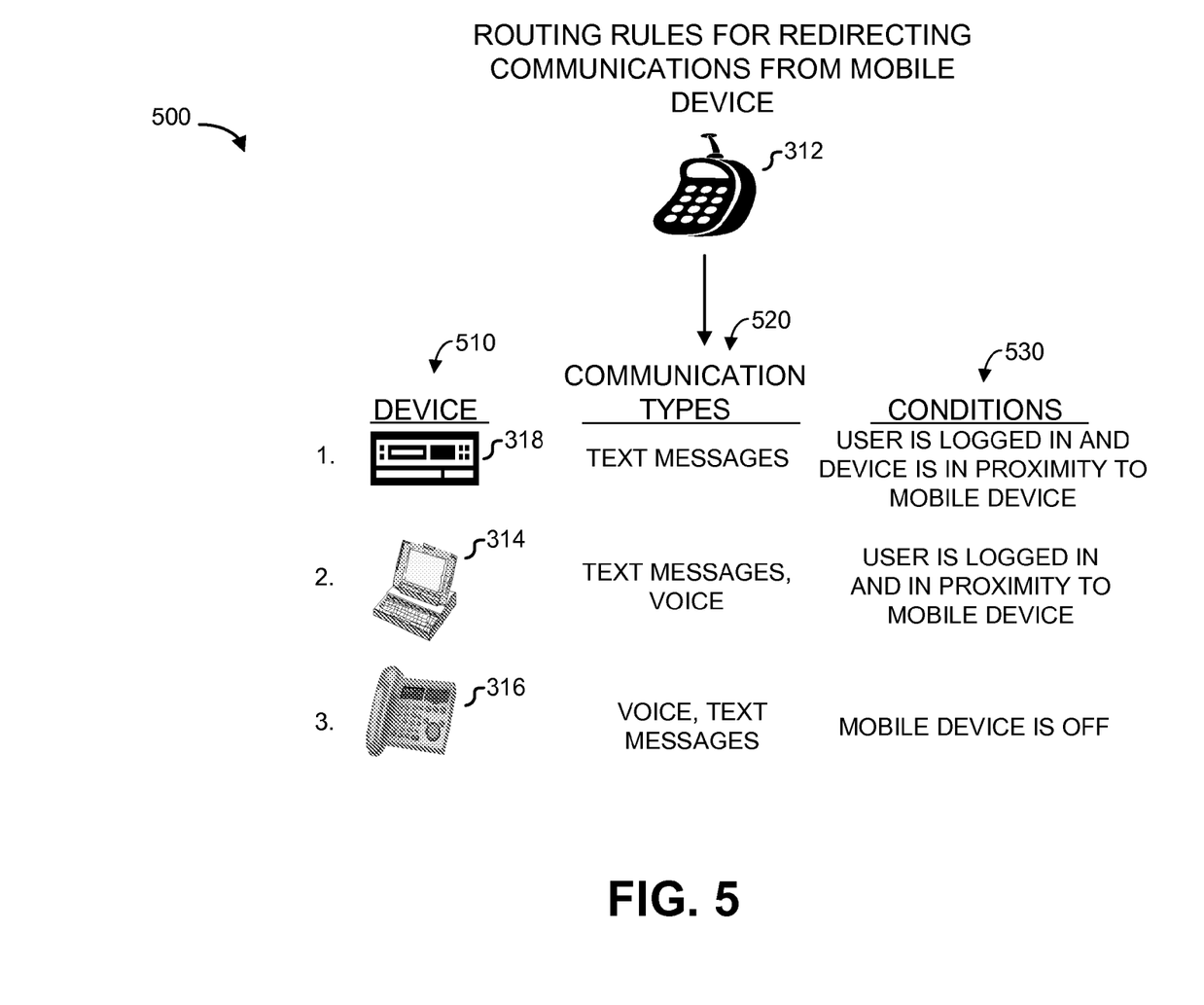
FIG. 5 is a diagram of an exemplary interface illustrating configuration information for routing communications from a mobile device to other endpoints.

FIG. 5 is a diagram of an exemplary interface 500 illustrating configuration information for routing communications from mobile device 312 to other endpoints. For each device 510, interface 500 may list a type of communications 520 for which automatic routing is to be applied and conditions 530 under which automatic routing is carried out. Additionally, the exemplary priority of devices 510 for receiving routed communications is indicated in interface 500 by the order in which the devices are listed. The priority may be applicable when all of the devices are in close proximity to a mobile device at the same time. Conditions 530 may generally define the states of devices 510 by which the automatic routing is performed.

As shown, set-top box 318 may be the highest priority device for receiving communications that are routed from mobile device 312. Further, set-top box 318 is set to be used to receive text messages. Additionally, the conditions for using set-top box 318 as an endpoint in place of mobile device 312 are specified as: the user may need to be logged into set-top box 318 and proximity with mobile device 312 is detected. Accordingly, if the user is at home watching television (and is potentially logged in to set-top box 318) and the user's mobile device 312 is near set-top box 318 and the user receives a text message (or multimedia message) that was originally directed to the number of mobile device 312, the message may be routed to set-top box 318.

Personal computer 314 is shown as the next highest priority endpoint for receiving communications that are re-routed from mobile device 312. Personal computer 314 may be used as an endpoint for text messages (or multimedia messages (MMS)) or voice calls. The conditions illustrated in this example for personal computer 314 include the condition that the user is logged in to a VoIP/IM application on their personal computer 314 and the condition that mobile device 312 is in proximity to personal computer 314. Accordingly, if these conditions are satisfied and the conditions for set-top box 318 are not satisfied, text messages or voice calls, destined for the user's mobile device 312 may be routed to personal computer 314.

Finally, telephone 316 may be used to receive re-routed communications from mobile device 312. As shown, telephone 316 may be configured to receive voice calls or text messages. For example, automatic routing may happen when, e.g. a Bluetooth-enabled VoIP phone is in proximity of mobile device 312. Telephone 316 may generally be implemented as a "regular" PSTN wireline phone or a stationary VoIP phone. Although telephone 316 is shown in FIG. 5 as being enabled for "voice" communication, in general, telephone 316 may be enabled to also receive text messages as text or as voice via a text-to-speech (TTS) function. A PSTN wireline phone may not use proximity technologies to stimulate re-routing of communications.

As previously mentioned, the initial routing configuration information, such as that shown in FIG. 5, may be modified by the user. For example, via interface 500, the user may select one or more of which devices to include, the communication types to receive at each device, and the conditions in which the devices are used. The selection of the initial routing information by the user may be a one-time or occasional event (i.e., whenever the user desires).

Returning to FIG. 4, application server 330 may receive presence information relating to the controlled endpoints 310 (act 402). The presence information may include proximity information relating to endpoints 310. The presence information may also include indications of which of endpoints 310 are active (i.e., turned on and connected to the network).

The proximity information may be based on whether an endpoint is currently "paired" with another device. For example, an endpoint may be paired with another device over a short range wireless standard such as Bluetooth. Bluetooth is a known radio standard and communications protocol primarily designed for low power consumption over relatively short ranges. Bluetooth-enabled devices can be configured to automatically discover and connect with other devices within range. When a device is paired with another device, it may be assumed it is in close physical proximity to the other device. Other techniques for automatically detecting proximity may include radio frequency identification (RFID) techniques or near-field communication (NFC) techniques, and could also be used to detect proximity.

Figure 6:
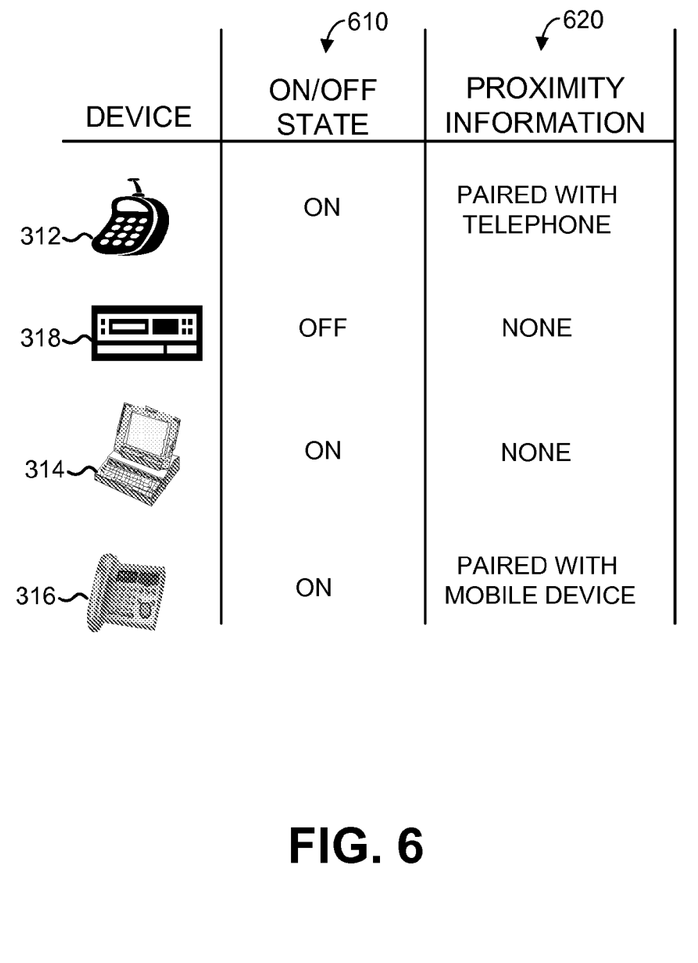
FIG. 6 is a diagram illustrating exemplary presence information for endpoints in a network.

FIG. 6 is a diagram illustrating exemplary presence information for endpoints 310. Presence server 340, or other devices in network 310, may keep track of the presence information for endpoints 310. The presence information may include on/off state information 610 and proximity information 620. An "off" condition in on/off state information 610 may indicate that the endpoint is not connected to network 110 (i.e., the endpoint is powered-on but not connected to network 110 or the endpoint is powered-off). An "on" condition in on/off state information 610 may indicate that the endpoint is connected to network 110 (i.e., the endpoint is powered-on and connected to network 110).

Proximity information 620 may indicate whether an endpoint is in close physical range of another registered endpoint. As mentioned previously, one way to infer physical proximity may be based on whether an endpoint is connected with or is in range of another endpoint over a short range wireless connection. Endpoints connected via a Bluetooth pairing, for instance, may be used to infer proximity. Other techniques for inferring proximity, such as other short range wireless protocols (e.g., NFC or RFID) may alternatively be used.

As shown in FIG. 6, mobile device 312 is "on" and in proximity to telephone 316; set-top box 318 is "off," personal computer (and the VoIP/IM application) is "on" but not in proximity to another device, and telephone 316 is "on" and is in proximity to mobile device 312.

Referring back to FIG. 4, based on the presence information and the routing configuration information, routing decisions may be made for the one or more endpoints (act 403). The routing decisions may be made by application server 330 and communicated to one or more network devices, such as SIP server 119, HLR/HSS 112, MSC 114, SMSC/MMSC 116, and SCP 118, as appropriate. In some situations the routing decisions may be communicated to endpoints 310, which may then re-route communications when appropriate by directly interacting with the network devices (e.g., SIP server 119, HLR/HSS 112, MSC 114, SMSC/MMSC 116, and SCP 118) or by interacting with the network devices through application server 330. In general, application server 330 may function to coordinate making of the routing decisions and controlling the network devices to forward communications intended for one endpoint to another endpoint.

To more thoroughly illustrate automatic routing as discussed above, a number of examples of automatic routing will next be described with reference to FIGS. 7-9.

Figure 7A:
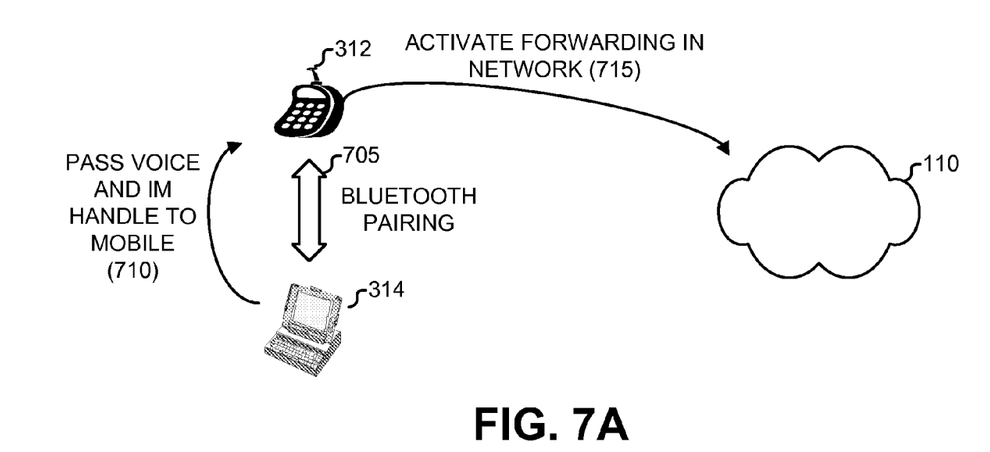
FIGS. 7A-7C are diagrams conceptually illustrating exemplary routing of communications directed to a mobile device to other endpoints.
Figure 7B:
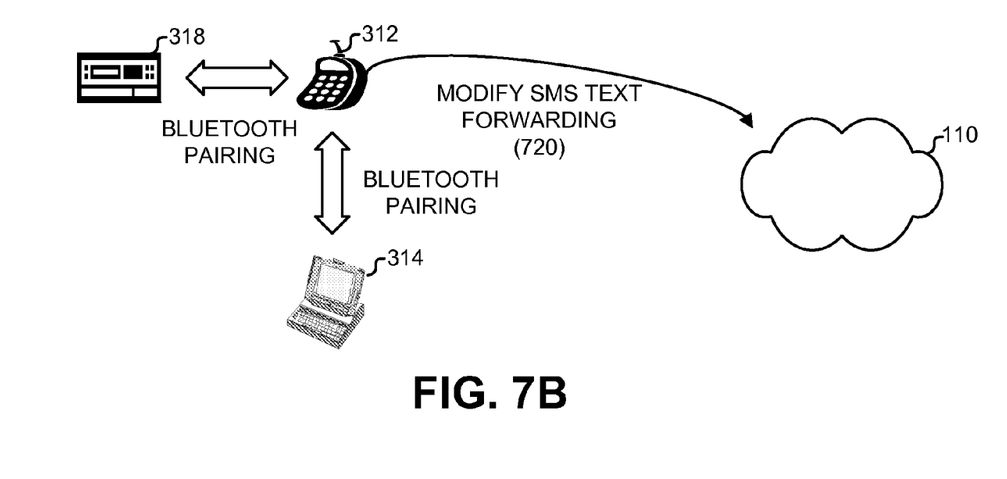
Figure 7C:
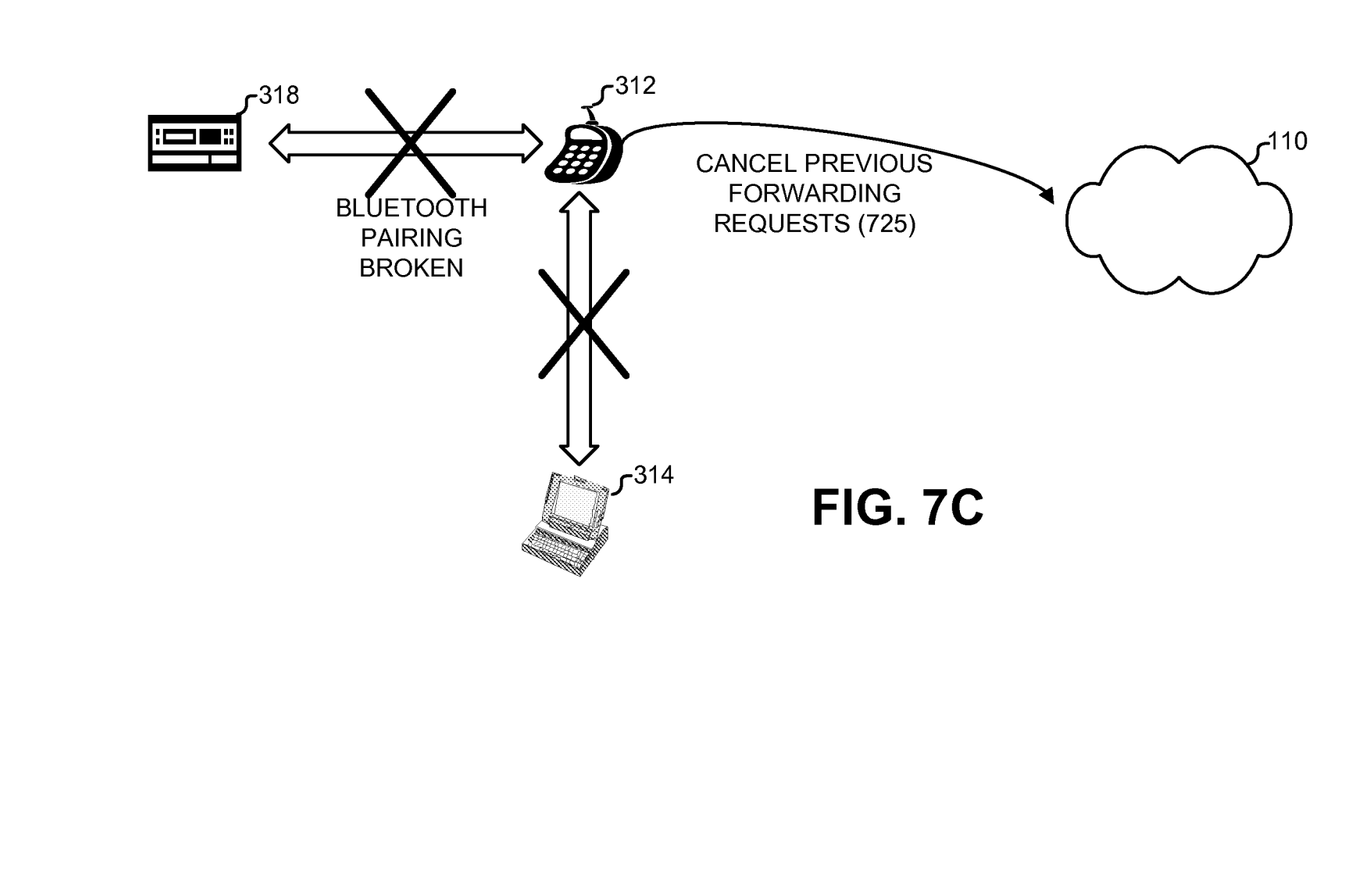

FIGS. 7A-7C are diagrams conceptually illustrating exemplary routing of communications directed to mobile device 312 to other endpoints 310. The examples discussed with respect to FIGS. 7A-7C use the exemplary routing conditions shown in FIG. 5. FIG. 7A is a diagram conceptually illustrating automatic routing in the context of mobile device 312 and personal computer 314. Assume that mobile device 312 is on and in the vicinity of personal computer 314, which is also on (i.e., a user is logged in to a VoIP/IM application). A Bluetooth pairing 705 may take place between the two devices. In response, personal computer 312 may pass its VoIP voice call address and/or a text messaging address (e.g., the user's IM handle) to mobile device 312 via the Bluetooth pairing 705 (reference number 710).

Mobile device 312 may use the addresses passed from personal computer 314 to activate call forwarding (e.g., voice or video) and/or message forwarding (e.g., SMS, IM, multimedia message (MMS), IM, mobile IM (MIM), or email header notification forwarding) in network 110 to personal computer 314 (reference number 715). In this manner, future communications, such as calls and messaging, to mobile device 312 may be forwarded to personal computer 314. Although mobile device 312 was described in this example as activating call forwarding, in alternate implementations, personal computer 314 may activate call forwarding or mobile device 312 may simply contact application server 330 which may then activate call forwarding on behalf of mobile device 312. In either event, the presence information and pre-specified automatic routing conditions may be used to determine whether to activate forwarding of a communication.

FIG. 7B is a diagram conceptually illustrating automatic routing in the context of mobile device 312, personal computer 314, and a set-top box 318. The example of FIG. 7B builds on the example shown in FIG. 7A. Assume that the user of personal computer 314 now decides to turn on a television. The user may thus turn on the television and set-top box 318. If set-top box is turned on, a second Bluetooth pairing between mobile device 312 and set-top box 318 may be created. Assume further that the user's routing preferences are identical to those shown in FIG. 5. As shown in FIG. 5, set-top box 318 is designated to receive text messages and has a higher priority than personal computer 314. Accordingly, mobile device 312 (or application server 330) may modify the SMS text forwarding in network 110 so that subsequent text messages are sent to set-top box 318 (reference number 720). A similar procedure would apply for an MMS message (assuming set-top box 318 is designated to receive MMS messages).

In some implementations, if mobile device 312 is powered down while communications to the mobile device are being forwarded, the forwarded communication preference may remain active until the next time mobile device 312 is powered-up. In other implementations, the forwarded communication preference may remain active for a predetermined time. At the end of this time, calls to mobile device 312 may be routed to mobile device 312 as normal. For example, application server 330 may reset the forwarded communication preference for mobile terminal 312 after a certain period of time.

Continuing the example shown in FIGS. 7A and 7B, assume that the user eventually moves out of Bluetooth range of set-top box 318 and personal computer 314. For example, the user may leave the house. FIG. 7C is a diagram conceptually illustrating this situation. In response to the loss of proximity information from either set-top box 318 and personal computer 314, mobile device 312 may cancel the previous forwarding requests made with network 110 (reference number 725). Alternatively, personal computer 314 or set-top box 318 may cancel the previous forwarding requests made with network 110.

In the example given above, a user with mobile device 312 moved between various endpoints within the user's house. As the user moved about, the final destination for communications (e.g., calls and text messages) to the user's mobile device may be automatically re-routed to various other preferred endpoints.

Figure 8:
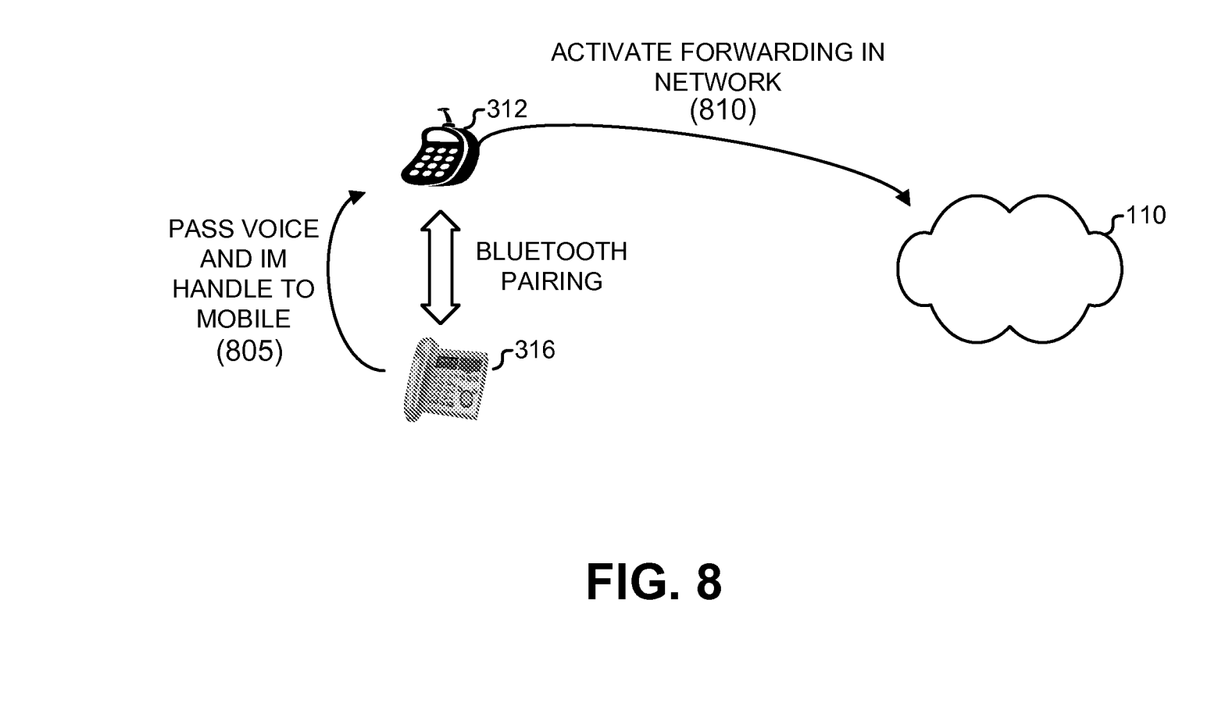
FIG. 8 is a diagram conceptually illustrating automatic routing in the context of a mobile device and a VoIP telephone.

FIG. 8 is a diagram conceptually illustrating automatic routing in the context of mobile device 312 and VoIP telephone 316. In this example, assume that mobile device 312 is in proximity to telephone 316, causing a Bluetooth pairing to take place. In response, telephone 316 may pass its VoIP telephone address and, if relevant, a text messaging address, to mobile device 312 (reference number 805). Mobile device 312 (or application server 330 or another network device) may use the addresses passed from telephone 316 to activate call forwarding and/or SMS forwarding in network 110 to telephone 316 (reference number 810). In some implementations, telephone 316 may not have the native ability to receive text messages. In this situation, a text to speech (TTS) engine may be used either within application server 330 or within another network device in network 110 to convert text messages to speech which can be audibilized by telephone 316.

The examples discussed above with respect to FIGS. 7 and 8 related to re-routing incoming calls (or text messages or other communications) intended for a mobile telephone to another endpoint. It can be appreciated that communications may be re-routed from other endpoints as well. For example, communications intended for set-top box 318, such as weather alerts, video alerts, or advertisements, may be routed to telephone 316 (if appropriate), mobile device 312, or to personal computer 314. As another example, communications from telephone 316 may be routed to other endpoints.

Figure 9:
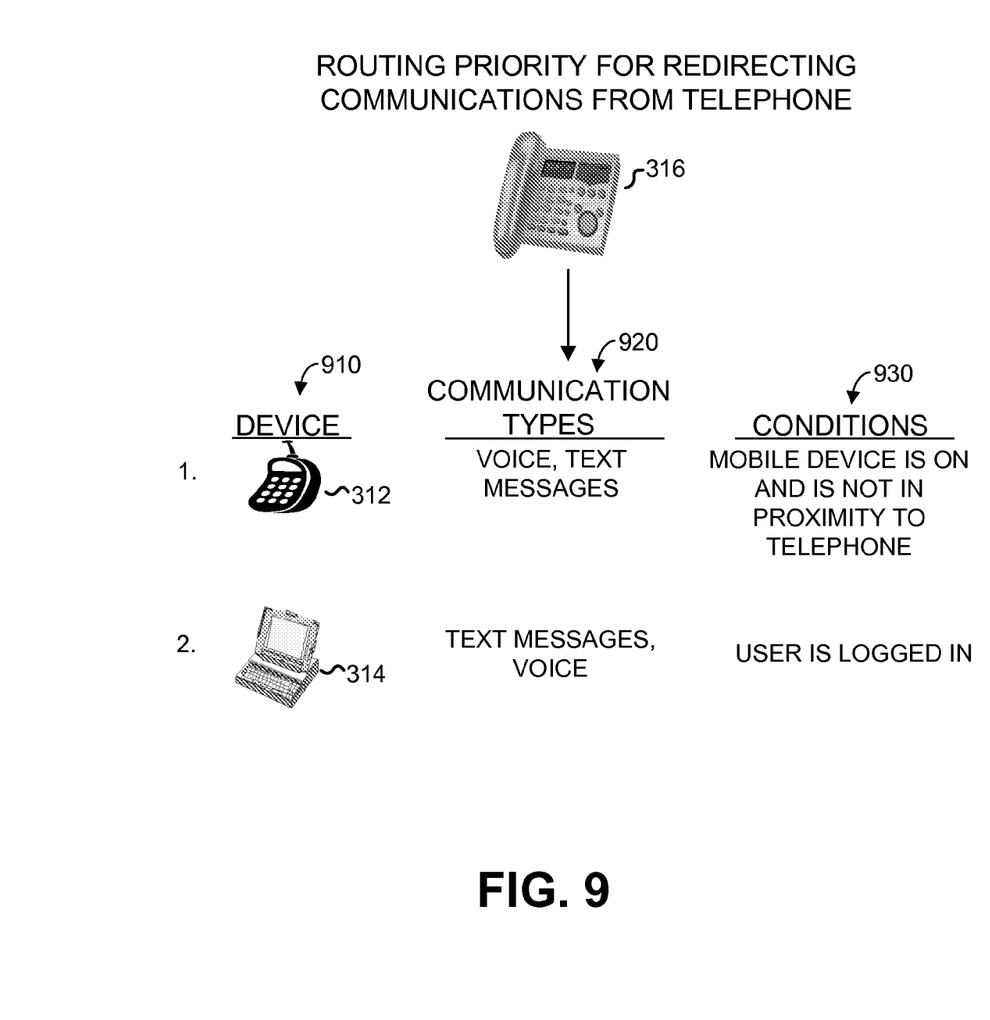
FIG. 9 is a diagram illustrating exemplary prioritization and conditions for routing communications from a telephone to other endpoints.

FIG. 9 is a diagram illustrating exemplary prioritization and conditions for routing communications from telephone 316 to other endpoints.

For each device 910, a type of communications 920 for which automatic routing is to be applied and conditions 930 under which automatic routing is carried out may be stored. As shown, mobile device 312 may be the highest priority device for receiving communications that are re-routed from telephone 316. Further, mobile device 312 may be used to receive voice and text messages. Additionally, the conditions for using mobile device 322 as an endpoint in place of telephone 316 may be specified as mobile device 312 is on and is not in proximity to telephone 316. In other words, with this condition, the user would like to have calls routed from telephone 316 to mobile device 312 if mobile device 312 is on and is not in proximity to telephone 316, such as when the user has left the house and is carrying mobile terminal 312.

Personal computer 314 is shown as the next highest priority for receiving communications that are re-routed from telephone 316. Personal computer 314 may be used as an endpoint for text messages or voice calls. The conditions illustrated in this example for personal computer 314 include the condition that the user is logged in to personal computer 314 and to the VoIP/IM application running on it. Accordingly, in this example, the user has chosen to receive calls or text messages for telephone 316 at personal computer 314 when the user is logged in to personal computer 314 and mobile device 312 is off or is in proximity to telephone 316.

In some situations, multiple users, such as a number of people in a family, may share a single home telephone line (single line appearance) although each of the family members may have their own mobile device 312. In one implementation for this situation, a media server may be used to initially receive telephone calls for the family. The media server may play a pre-recorded message asking the caller to select with which family member the caller is interested in speaking. Based on the caller's selection, the call may be forwarded to the home telephone 316 or to the appropriate mobile device using routing rules such as the routing prioritization rules and conditions shown in FIG. 9. With multiple users, however, a separate set of routing prioritization rules and conditions may be specified for each user. For example, a first member of the family may desire that all calls destined for him be forwarded to his mobile device, regardless of whether his mobile device is on or is in proximity to telephone 316. A second member of the family, however, may specify that calls should only be forwarded to her mobile device when it is on and it is not in proximity to telephone 316. If telephone 316 is a VoIP phone, then, in most cases, it will have multiple line appearance functionality. This feature may allow each family member to have their own home numbers/addresses, in which case routing of the calls and messages to a mobile devices becomes unambiguous and simple.

Automatic "intelligent" routing of communications to user endpoints was described above. The techniques described allow for a user configurable/customizable routing rules by which communications may be automatically routed to an endpoint of choice. Additionally, the routing rules may take into account endpoint proximity, which may allow for further control of when to automatically select routing to a particular device.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of acts have been described above with respect to FIG. 4, the order of the acts may differ in other implementations consistent with principles of the invention. Moreover, non-dependent acts may be performed in parallel.

It will be apparent that aspects of the embodiments, as described above, may be implemented in many different forms of software, firmware, and hardware in the implementations illustrated in the figures. The actual software code or specialized control hardware used to implement these embodiments consistent with the principles of the invention is not limiting of the invention. Thus, the operation and behavior of the preferred embodiments of the invention were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a network device, configuration information relating to forwarding of communications in a network that includes a plurality of endpoint devices;
    receiving, by the network device, presence information for the plurality of endpoint devices, the presence information including proximity information indicating whether pairs of the plurality of endpoint devices are in physical proximity to one another,
        where the proximity information indicates that a first endpoint device, of the plurality of endpoint devices, and a second endpoint device, of the plurality of endpoint devices, are in physical proximity, and
        where the configuration information indicates that a communication, intended for the first endpoint device, is to be forwarded to the second endpoint device in response to the indication, in the proximity information, that the first endpoint device and the second endpoint device are in physical proximity; and
    causing, by the network device and based on the configuration information and the presence information, communications, intended for a first endpoint device, to be forwarded to a second endpoint device.

2. The method of claim 1, where the presence information further includes information indicating whether an endpoint device, of the plurality of endpoint devices, is connected to the network.

3. The method of claim 1, where the configuration information identifies one or more types of communications, of a plurality of types of communications, that are to be forwarded to the second endpoint device, and
  where causing the communications, intended for the first endpoint device, to be forwarded to the second endpoint device further includes:
    determining whether a particular type of the communications, associated with the communications intended for first endpoint device, is included in the one or more types of communications, and
    causing the communications to be forwarded to the second endpoint device when the particular type is included in the one or more types of communications.

4. The method of claim 3, where the one or more types of communications include one or more of:
  voice calls,
  text messages,
  video calls,
  voice messages,
  video messages, or
  multimedia messages.

5. The method of claim 1, where the configuration information further identifies conditions under which the communications intended for the first endpoint device, are to be forwarded to the second endpoint device when the first endpoint device and the second endpoint device are in physical proximity.

6. The method of claim 5, where the second endpoint device is included in a plurality of second endpoint devices that are in physical proximity to the first endpoint device, and
  where the conditions define, for each one of the plurality of second endpoint devices, when the communications, intended for the first endpoint device, are to be forwarded to the one of the plurality of second endpoint devices.

7. The method of claim 6, where the configuration information further includes relative priority information, where the relative priority information identifies an order in which the communications, intended for the first endpoint device, are to be forwarded to the plurality of second endpoint devices.

8. The method of claim 1, where the configuration information is customizable by a user.

9. The method of claim 1, where the plurality of endpoint devices include one or more of:
  a mobile telephone,
  a set-top box,
  a telephone,
  a personal digital assistant, or
  a personal computer.

10. The method of claim 1, where receiving the presence information further includes:
  determining that a pair of the plurality of endpoint devices are proximate to one another when the pair of the plurality of endpoint devices are connected via at least one of:
    a short-range wireless network,
    radio frequency identification (RFID) proximity detection, or
    near-field communication proximity detection.

11. The method of claim 1, where causing the communications to be forwarded to the second endpoint device further includes:
  causing one or more devices, in the network, that provide control points for telephony or data services in the network, to forward the communications.

12. A system comprising:
  one or more servers to:
  receive configuration information from a user, the configuration information relating to forwarding of communications in the network between various ones of a plurality of endpoint devices, the configuration information including user configurable conditions describing when communications to one of the plurality of endpoint devices is to be automatically forwarded to another of the plurality of endpoint devices,
  maintain, for the plurality of endpoint devices, presence information that includes information indicating whether each of the plurality of endpoint devices is in physical proximity to each other one of the plurality of endpoint devices,
    where the presence information indicates that a first endpoint device, of the plurality of endpoint devices, and a second endpoint device, of the plurality of endpoint devices, are in physical proximity, and
    where the configuration information indicates that a communication, intended for the first endpoint device, is to be forwarded to the second endpoint device in response to the indication, in the presence information, that the first endpoint device and the second endpoint device are in physical proximity; and
  coordinate forwarding of the communications in the network between the plurality of endpoint devices based on the presence information and based on the configuration information.

13. The system of claim 12, where the presence information further includes information indicating whether each of the plurality of endpoint devices are connected to the network.

14. The system of claim 12, where the configuration information includes an indication of one or more types of communications, of a plurality of types of communications, that are to be forwarded from a particular one, of the plurality of endpoint devices, to another particular one of the plurality of endpoint devices.

15. The system of claim 14, where the plurality of types of communications include one or more of:
  voice calls,
  text messages,
  video calls,
  voice messages,
  video messages, or
  multimedia messages.

16. The system of claim 12, where the configuration information includes information regarding a priority of the plurality of endpoint devices for receiving communications associated with a particular endpoint device of the plurality of endpoint devices, and
  where the application server, when coordinating the forwarding of the communications, is further to:
    cause the communications associated with the particular endpoint device to be forwarded to two or more of the endpoint devices based on the information regarding the priority.

17. The system of claim 12, where the plurality of endpoint devices include one or more one of:
  a mobile telephone,
  a set-top box,
  a telephone,
  a personal digital assistant, or
  a personal computer.

18. A method comprising:
- receiving, by a network device and from a user, a list of devices to register for automatic routing of communications, where each device, in the list of devices, is associated with an endpoint;
- receiving, by the network device and from the user, a relative priority by which a plurality of other endpoints are to be forwarded a communication that is intended for a first endpoint;
- receiving, by the network device, conditions during which the communication, intended for the first endpoint, is forwarded to one or more other endpoints, of the plurality of other endpoints, the conditions including:
  - proximity information associated with respective physical proximities of the first endpoint and the plurality of other endpoints, where the proximity information indicates that the first endpoint and the one or more other endpoints are in physical proximity, and
  - status information associated with respective operational statuses of the first endpoint and the plurality of other endpoints, where the status information indicates that the one or more other endpoints are operational; and
- automatically forwarding, by the network device and based on relative priority and the conditions, the communication, intended for the first endpoint, to the one or more other endpoints.

19. The method of claim 18, where the conditions include conditions based on whether the endpoints are connected to a network.

20. The method of claim 18, where the list of devices include one or more of:
- a mobile telephone,
- a set-top box,
- a telephone,
- a personal digital assistant, or
- a personal computer.

21. The method of claim 18, where automatically forwarding the communication further includes:
- detecting a change in least one of the proximity information or the status information associated with a particular other endpoint, of the one or more other endpoints; and
- causing the communication to be forwarded, based on the relative priority, to others of the one or more other endpoints that differ from the particular other endpoint.

* * * * *